(12) United States Patent
Frazier

(10) Patent No.: US 7,894,123 B2
(45) Date of Patent: Feb. 22, 2011

(54) MULTILAYER LIGHT MODULATOR

(75) Inventor: Gary A. Frazier, Garland, TX (US)

(73) Assignee: Raytheon Company, Waltham, MA (US)

( * ) Notice: Subject to any disclaimer, the term of this patent is extended or adjusted under 35 U.S.C. 154(b) by 38 days.

(21) Appl. No.: 12/395,046

(22) Filed: Feb. 27, 2009

(65) Prior Publication Data

US 2010/0220381 A1 Sep. 2, 2010

(51) Int. Cl.
*G02B 26/00* (2006.01)
*G09G 3/34* (2006.01)

(52) U.S. Cl. ...................... 359/296; 345/107

(58) Field of Classification Search ................ 345/107; 359/260, 296, 321, 579, 589
See application file for complete search history.

(56) References Cited

U.S. PATENT DOCUMENTS

| | | | | |
|---|---|---|---|---|
| 3,341,274 | A * | 9/1967 | Marx | .......................... 359/296 |
| 5,784,189 | A | 7/1998 | Bozler et al. | |
| 6,136,551 | A | 10/2000 | Aoki et al. | |
| 6,166,787 | A | 12/2000 | Akins et al. | |
| 6,422,687 | B1 | 7/2002 | Jacobson | |
| 6,865,010 | B2 * | 3/2005 | Duthaler et al. | ............. 359/296 |
| 7,019,900 | B2 * | 3/2006 | Benning et al. | ............. 359/459 |
| 7,701,435 | B2 | 4/2010 | Hiramatsu | |
| 7,701,436 | B2 | 4/2010 | Miyasaka | |
| 7,701,476 | B2 | 4/2010 | Brown Elliott et al. | |
| 7,704,573 | B2 | 4/2010 | Itami et al. | |
| 7,706,051 | B2 | 4/2010 | Hattori et al. | |
| 7,706,052 | B2 | 4/2010 | Kang et al. | |
| 7,710,388 | B2 | 5/2010 | Hirata et al. | |
| 7,710,389 | B2 | 5/2010 | Kazmaier et al. | |
| 7,710,528 | B2 | 5/2010 | Hasegawa et al. | |
| 2009/0201570 | A1 * | 8/2009 | Frazier et al. | ................ 359/296 |

FOREIGN PATENT DOCUMENTS

| | | |
|---|---|---|
| WO | WO 03/083561 A2 | 10/2003 |
| WO | WO2004/051354 A1 | 6/2004 |

OTHER PUBLICATIONS

PCT Notification of Transmittal of the International Search Report and the Written Opinion of the International Searching Authority, or the Declaration mailed Jun. 1, 2010, regarding international application PCT/US2010/024213 filed Feb. 15, 2010, Jun. 1, 2010.

\* cited by examiner

*Primary Examiner*—David N Spector
(74) *Attorney, Agent, or Firm*—Baker Botts L.L.P.

(57) ABSTRACT

A multilayer light modulator includes, a light modulating stack operable to transform an electrical control signal into a modulated optical signal. The light modulating stack comprises one or more optically reflecting layers, optically transmitting layers, and optically variable layers. The optically variable layer comprises a plurality of electrophoretic particles supported in a fluid. The multilayer light modulator also includes a bias generator coupled to the optically variable layers. The bias generator is responsive to the electrical control signal, wherein the bias generator creates a bias that changes the reflectance of the light modulating stack by causing the electrophoretic particles to move within the fluid.

14 Claims, 2 Drawing Sheets

MULTILAYER LIGHT MODULATOR

TECHNICAL FIELD OF THE INVENTION

This invention relates in general to light modulators and, more particularly, to a device and method for implementing a multilayer light modulator.

BACKGROUND

It is generally useful to provide an electronic means to modulate the intensity of optical radiation. Applications of such modulators include spatial light modulators, optical displays, and the like. Example light modulators include liquid crystal, electrochromic, electromechanical, Bragg, and others. Liquid crystal modulators rely on rotating the plane of polarization to modulate light. More specifically, a fixed polarizer is used to polarize the incident light so that the rotation effect may be controlled and employed to form a light modulating element. An electric field can be used to alter the degree of rotation and thereby alter the effective transmission or reflection from this type of modulator. Electrochromic modulators inject ions into (or out of) a material such that the material changes from being optically transparent to optically absorbing. A back reflector (e.g., a metal mirror) is placed behind this material so that light may either be reflected by this mirror back to the observer, or absorbed by the electrochromic layer. The mirror is perforated so that ions may pass through the mirror.

SUMMARY

In accordance with a particular embodiment, a multilayer light modulator includes a light modulating stack operable to transform an electrical control signal into a modulated optical signal. The light modulating stack comprises one or more optically reflecting layers, optically transmitting layers, and optically variable layers. The optically variable layers comprise a plurality of electrophoretic particles supported in a fluid. The multilayer light modulator also includes a bias generator coupled to the optically variable layers. The bias generator is responsive to the electrical control signal, wherein the bias generator creates a bias that changes the reflectance of the light modulating stack by causing the electrophoretic particles to move within the fluid.

Technical advantages of particular embodiments include the ability to provide a light modulator suitable for use over a specified range of optical frequencies such that light may be reflected from an optical surface with controllable intensity.

Other technical advantages may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments and their advantages, reference is now made to the following description taken in conjunction with the accompanying drawings, in which.

DETAILED DESCRIPTION OF THE DRAWINGS

Figure 1:
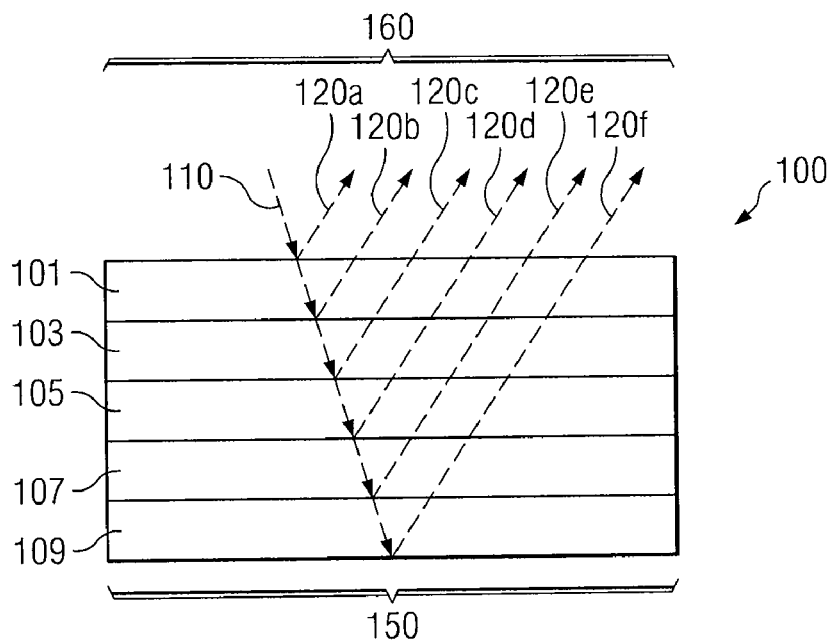
FIG. 1 depicts a multilayer optical interference filter.

FIG. 1 depicts a multilayer optical interference filter. Multilayer optical interference filter 100 is formed by combining several layers of generally planar, optically transparent materials and arranging them in a vertical stack. The combination of layers may cause light 110 incident upon filter 100 to undergo multiple internal reflections (120a-120f). As will be discussed in greater detail below, the characteristics of reflections 120 may depend on the materials used in layers 101, 103, 105, 107, and 109 and the differences between the materials of respective adjacent layers.

Filter 100 may comprise obverse side 160 and reverse side 150. Obverse side 160 of stack 100 represents the viewing surface to which light 110 may be incident. This light may come from a light source that may be natural or artificial in nature. Light reflected from stack 100 is composed of light rays or light waves that reflect from the top viewing surface 160 (reflected light 120a) and light that reflects from each optical interface between all of the layers of stack 100 (reflected light 120b-120f). The collection of reflected light 120 from stack 100 may be redirected by the reflection process to be viewed by a user or detected by an optical sensor.

In a light modulator, electrophoretic particles may be used to change the reflection and refraction at the interfaces between one or more respective adjacent layers of filter 100. By using movable electrophoretic particles suspended in fluid for one or more of the layers of filter 100, it may be possible to change the optical boundary conditions between one or more layers. Thus, light 110 incident upon filter 100 may be either strongly reflected or strongly absorbed due to a change in the position of the particles. In other words, the optical interference of the combined filter layers and electrophoretic material may change based on the position of the particles.

As mentioned above, light 110 may be reflected and refracted at the boundary between two optically dissimilar materials. The optical reflectance of the interface between two layers may be calculated using an equation, $[(n1-n2)/(n1+n2)]^2$, where n1 and n2 are the indexes of refraction for two adjacent layers (e.g., layers 101 and 103). In general, a high reflectance at an interface between two materials requires that the index of refraction of the two materials be as different as possible. For example, the reflectance of silicon (index=3.7) in air is about $[(3.7-1)/(3.7+1)]^2=33\%$. However, the reflectance of polyester film (index-1.5) in air is only about $[(1.5-1)/(1.5+1)]^2=4\%$. Thus, if it is desired to provide high reflectance using a minimum number of layers of material, it is best to use materials that have highly dissimilar indexes of refraction.

By switching the location of two adjacent layers, such as layers 105 and 107, without changing the properties of the respective layers, the average reflectance of filter 100 may be significantly altered. For example, if layers 101, 105, and 109 had an index of 1.4 and layers 103 and 107 had an index of 3.7, then each interface between the layers may comprise materials having relatively dissimilar indexes of refraction. Then, if layers 105 and 107 were switched, so that layers 103 and 107 are adjacent and layers 105 and 109 are adjacent, at least two of the interfaces between the layers may comprise materials having relatively similar indexes of refraction (layers 103 and 107 both have an index of 3.7, and layers 105 and 109 both have an index of 1.4). In this example, the switch may change the average reflectance of light 110 (over the 1 to 12 micrometers spectral band) by 34.6%. Thus, changing the order of light absorbing and light transmitting layers can significantly alter the optical reflectance of an interference stack.

Figure 2A:
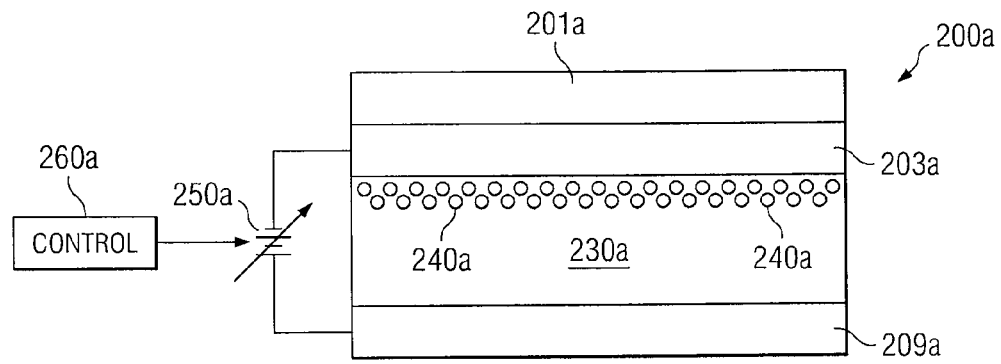
FIGS. 2A and 2B depict a multilayer light modulator in two different states, in accordance with particular embodiments.
Figure 2B:
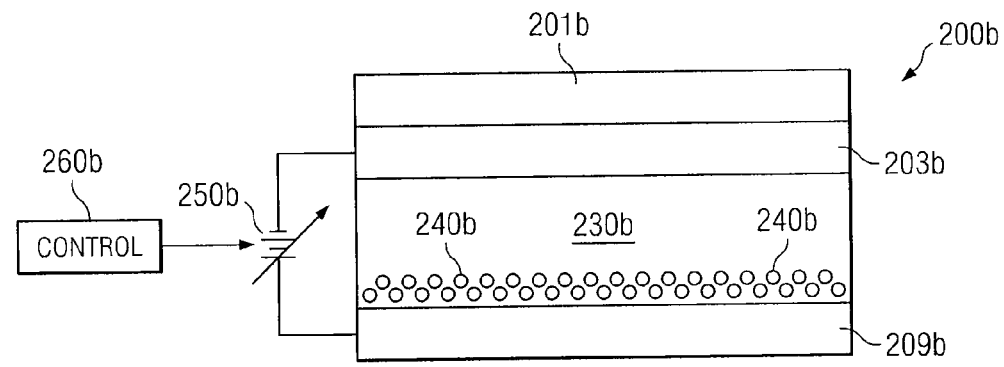
Figure 2C:
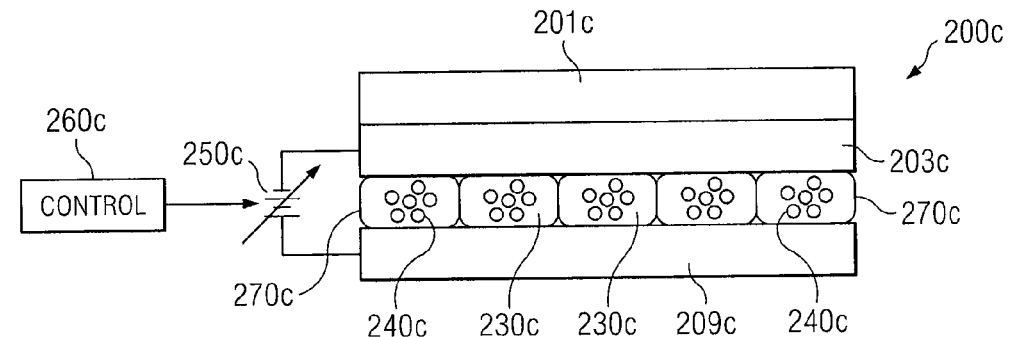
FIG. 2C depicts a multilayer light modulator comprising a layer of microencapsulated electrophoretic material, in accordance with particular embodiments.

FIGS. 2A and 2B depict a multilayer light modulator in two different states, in accordance with particular embodiments. In FIG. 2A, the majority of the electrophoretic particles 240 create a thin film of optically absorbing material just under layer 203; and in FIG. 2B the majority of the electrophoretic particles 240 create a similarly thin film of optically absorbing material on top of layer 209. Thus, in essence, FIG. 2 illustrate the effective re-ordering of the layers in the stack of multilayer light modulator 200 by moving electrophoretic particles 240 within an optically transparent fluid 230. In other words, fluid 230 represents one layer, and particles 240 represent another layer. Thus, moving particles 240 between the two steady states shown in FIG. 2 essentially switches the position of two layers of the stack, thereby creating multilayer light modulator 200.

A light modulator for a desired spectral band may be designed by taking into account the variations in optical properties of the material used in the stack. For example, the plastic or glass materials that form the layers of the stack may be selected, in part, based on the optical refractive index of fluid 203. In particular embodiments, the layers of the stack may comprise materials that introduce large discontinuities in the refractive index between layers. This may improve the modulation efficiency of a modulator over specific ranges of optical frequencies. Thus, depending on the embodiment, multilayer light modulator 200 may be designed to provide a degree of optical modulation across a relatively narrow or relatively broad range of optical frequencies.

Light modulator 200, as depicted in FIG. 2, comprises stack 200 made up of layers 201, 203, and 209 with particles 240 and fluid 230 acting as two additional layers. Light modulator 200 further comprises voltage source 250 for providing the necessary bias to move particles between the steady states depicted in FIGS. 2A and 2B. Voltage source 250 may be responsive to control signal 260.

As indicated above, the composition (e.g., thickness, dielectric constant, index of refraction, etc.) and arrangement of layers 201, 203, and 209 may affect the center frequency and bandwidth of the wavelengths over which optical modulation occurs. In certain embodiments, layer 201 may be generally transparent at the optical frequencies over which light modulator 200 is to operate.

In particular embodiments, fluid 230 may be contained by layers 203 and 209. In certain instances, at least one of layers 203 or 209 may comprise a material of high refractive index such as silicon, germanium, silicon nitride, rutile, diamond, or the like. Depending on the design requirements for multilayer light modulator 200, it may be desirable to select a material having low optical loss and a high refractive index. For example, a light modulator designed for the 2-12 micron region of the infrared spectrum might use silicon or germanium. Diamond or rutile may be appropriate for use in light modulators designed for the visible spectrum.

Once the materials of layers 201, 203, and 209 are known, the thickness of each layer may be determined. In some embodiments it may be desirable to use a thickness that maximizes the change in the reflectance of light incident upon the light modulator when electrophoretic particles 240 move from one encapsulating surface to the other. In determining the thickness, it may also be desirable to take into account characteristics of particles 240.

In particular embodiments, layers 203 and 209 may be arranged so as to form a parallel plate capacitor with fluid 230 and the suspended electrophoretic particles 240 filling the space between the plates of the parallel plate capacitor. In particular embodiments, layers 203 and 209 may, in essence, create the cavity in which fluid 230 is contained.

Electrophoresis typically requires a relatively small amount of electrical current. In some embodiments, the electrical conductivity of layers 203 and 209 may be relatively low. Electrical resistances of several tens-of-thousands of ohms per square of material may be sufficient to establish a uniform electrical field between layers 203 and 209. The uniform electrical field may provide uniform electrical forces that may help to uniformly pack electrophoretic particles 240 against the respective electrode.

In certain embodiments, layer 209 may comprise an optically transparent material having a thickness and optical index of refraction that will reflect light normally incident upon the outer surface of layer 201 with relatively high efficiency when the electrophoretic particles 240 are moved away from layer 209 and with relatively low efficiency when particles 240 are moved towards layer 209.

By including layers 201, 203, and 209 with the electrophoretic modulator (fluid 230 and particles 240) multilayer light modulator 200 may be able to provide the ability to modulate certain wavelengths of light with a higher contrast than a device that uses only an electrophoretic modulator. The additional layers may also allow multilayer light modulator 200 to reflect light in a specular (mirror-like) manner. For example, multilayer light modulator 200 may be able to provide a relatively high specular reflectance in one state, and relatively high absorbance in another state. At least part of the reason the additional layers 201, 203, and 209 allow for improved specular reflectance is that they may help compensate for the fact that the use of particles 240 may, by their very nature, tend to randomly diffuse light thereby scattering it in undesired directions.

As mentioned above, fluid 230 fills the void between layers 203 and 209 and provides the medium in which particles 240 are suspended. It may be desirable for fluid 230 to have a viscosity that allows particles 240 to move freely within fluid 230 when biased yet remain still when the bias is no longer being applied. This allows for relatively low power consumption because layers 203 and 209 need only be biased long enough to move particles 240 to the desired surface and fluid 240 prevents the particles from drifting away. In certain embodiments, fluid 230 may comprise a fluid selected to be of the lowest possible refractive index. For example fluid 230 may be water, hexane, decane, methanol, or other organic fluids. In some embodiments, fluid 230 may be an isoparaffinic fluid which may have relatively low electrical conductivity. If the particles selected are able to move in air, then air may be an ideal carrier fluid since it has the lowest index of refraction. As a practical matter, fluid 230 may at least have a relatively small optical absorption (e.g., k=0.1) due to the fact that some of the individual particles may not be electrified or may otherwise remain in suspension contributing to a background level of absorption.

As alluded to above, the material used for particles 240 may have an impact on the overall performance of light modulator 200. The characteristics of particles 240 may vary greatly depending on the intended application and/or desired results. Some of the characteristics that may change include the charge of the particles, the size of the particles, the color of the particles, the material of the particles, the shape of the particles and any other characteristics that may affect one or more characteristics of the stack. With respect to the size of particles 240, it is generally understood that the modulation bandwidth of a light modulator based on electrophoresis is generally inversely proportional to the size of the individual particles. Thus, it may be desirable to use relatively small particles. These small particles tend to scatter incident light in a non-specular manner making it difficult to obtain mirror-like reflections. However, these same small particles may be well suited to providing diffuse scattering and/or optical absorption. Thus, when designing a multilayer light modulator it may be desirable to use electrophoretic particles to remove optical energy from the system rather than to specularly reflect optical energy within the system.

In some embodiments, particles 240 may comprise particles of silicon, appropriately doped to induce optical absorption and electrified to act as electrophoretic particles. Silicon particles 240 may be able to lie down to produce a thin film with an effective index of refraction of about 3.68 which may approximate a solid film of optically absorbing silicon. If the packing of particles 240 contains voids (e.g., in some scenarios particles 240 may only be 50% compacted), then the effective dielectric constant of the packed film may be a linear combination of the dielectric constant for particles 240 and suspending fluid 230. Optimizing light modulator 200 may require using particles 240 and a suspending fluid 230 that result in maximal and minimal reflectance in the two states depicted in FIG. 2.

Carbon may be another material of choice for particles 240. Carbon is easily charged electrically and is a well known electrophoretic material. Carbon also has a strong optical absorption characteristic over a very wide spectral band so that electrophoretic carbon may be used over a range of wavelengths spanning the visible spectrum through radio frequencies. For example, graphite carbon displays an index of refraction (n) between 2.0 to 2.4 in the wavelength range of 0.5 to 12 micrometers. This structure of carbon has an optical absorption constant (k) of 1.3 and 8.75 in the same spectral range. Other particles that may make for useful electrophoretic materials include rutile particles, metal spheres, metallized dielectrics, planar metal sheets, metallic flakes, and particles of high dielectric constant that may have essentially no optical absorption, and the like.

Because electrophoretic particles 240 may be contained between layers 203 and 209, it may be that particles 240 may only be able to affect the optical properties at the interfaces with layers 203 and 209. In other words, particles 240 may be constrained by the bounds of their encapsulating materials so that only the inner surfaces of the encapsulating layers 203 and 209 can be closely approached by these particles. Accordingly, particles 240 may be too far removed from layer 201 to provide any tangible effect on the optical properties of layer 201.

In particular embodiments, electrical control signals may be converted into a modulated optical signal by adjusting the bias applied by variable voltage source 250. Because electrophoretic particles may be made to move under the influence of an electric field, the motion of particles 240 may be accomplished by making layers 203 and 209 electrically conducting. Then, a bias applied between the two layers may cause the electrophoretic particles 240 to move toward or away from, for example, layer 203 of multilayer light modulator 200. As indicated above, this motion of particles 240 may cause a change in reflectance of the obverse side of multilayer light modulator 200 so that light may be reflected from or absorbed by multilayer light modulator 200 based on the electrical control signal 260.

The bias between layers 203 and 209 may then be adjusted via voltage source 250 in response to changes in control signal 260. As discussed above, switching the bias applied to layers 203 and 209 may cause particles 240 to move towards one or the other of the layers. In particular embodiments, the bias may be supplied by a battery. The rate at which particles 240 may switch between the states depicted in FIG. 2A and FIG. 2B may exceed typical video rates. For example, in some scenarios light modulator 200 may be capable of switching between states in excess of 100 switches per second.

Besides the relative bias of layers 203 and 209, the direction in which particles 240 move may also depend on the charge of the particles themselves. For example, assume that at a particular moment in time layer 203 is biased at a higher potential than layer 209, then if particles 240 are positively charged they would move towards layer 209 and if particles 240 are negatively charged then they would move towards layer 203.

Because multilayer light modulator 200 relies on optical interference for its modulation, it may be desirable for the layers to be relatively planar and not include sources of scattering (as would happen if amorphous or disordered materials were used). Also, because layers 203 and 209 are a pair of electrodes that generate the electric fields used to move the electrophoretic particles, it may be desirable to take into account any changes in the optical properties of the otherwise non-conducting layers. Layers 201, 203, and 209 of multilayer light modulator 200 may be arranged so as to take advantage of the ability of electrophoretic particles to scatter and/or absorb optical energy. For example, in certain embodiments, one of layers 203 or 209 may have a relatively low refractive index and the other layer 209 or 203 may have a relatively high refractive index. Thus, moving electrophoretic particles 240 may alter the reflectance at the boundary between a high index and low index material. In particular embodiments, it may be desirable for electrophoretic particles 240 to be encapsulated by a material that has a large difference in refractive index or optical absorption (or both) between particles 240 and that of layers 203 and 209 and the suspending fluid 230.

While the stack of the depicted multilayer light modulator 200 includes three layers (201, 203 and 209) and a single electrophoretic modulator (fluid 230 and particles 240), other embodiments may include more or less optical layers as well as additional electrophoretic modulators. For example, in FIG. 2C the gap between layers 203 and 209 is filled with a layer of microencapsulated electrophoretic material. The microencapsulated electrophoretic material may comprise a plurality of individual capsules 270c filled with fluid 230c and particles 240c. In using capsules 270, it may be desirable to account for the optical properties and index of refraction of the upper and lower surfaces of the capsule. In other words, using capsules 270 creates two additional layers as compared to multilayer light modulators 200a or 200b. The use of individual capsules 270 may simplify the handling and fabrication of multilayer light modulator 200c.

In some embodiments, a specific coating (e.g., transparent oxides, oxynitrides, carbon nanotubes, etc.) may be introduced to provide electrical conductivity rather than incorporate electrical conductance into an otherwise non-conducting layer. Furthermore, the layers may include any variations in thickness that may provide useful values of modulation contrast over specific optical frequencies.

Figure 3:
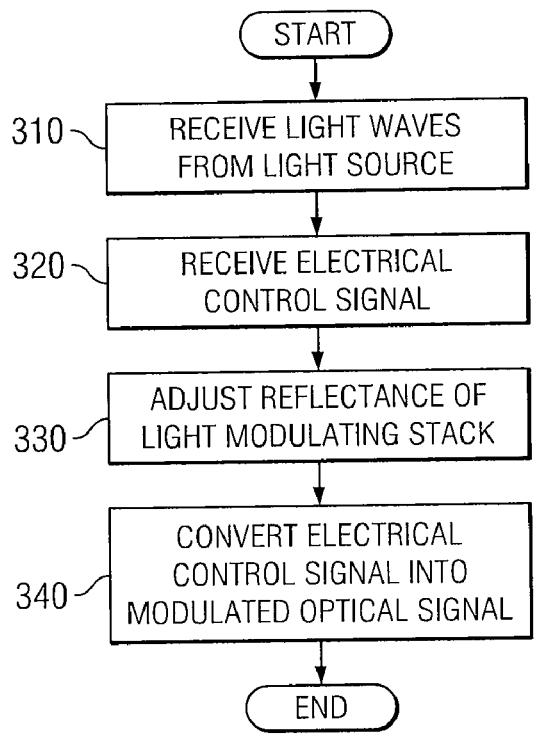
FIG. 3 depicts a method for implementing a multilayer light modulator, in accordance with particular embodiments.

FIG. 3 depicts a method for implementing a multilayer light modulator, in accordance with particular embodiments. For purposes of the depicted method it may be assumed that the multilayer light modulator comprises a stack similar to the stack of FIG. 2A.

The method begins at step 310 with the stack receiving light waves from a light source. The light source may comprise both natural (e.g., the sun) and artificial (e.g., light emitting diode) sources of light. The spectrum of the light waves received by the light modulator may vary depending on the source from which they are received. For example, light waves from the sun may comprise a broad spectral range, whereas light waves from an LED may be more narrowly directed to a more specific spectral range (e.g., the range of spectrum associated with a particular shade of blue).

At step 320 the stack receives an electrical control signal. The electrical control signal and the light waves (step 310) may be received concurrently. More specifically, in some embodiments, the stack may be exposed such that whenever the sun is out, the stack receives sunlight. Accordingly, when the electrical control signal is being received, so to are the light waves from the sun. As discussed above, the electrical control signal may comprise information that may be used to adjust the bias supplied by a voltage source. By controlling the bias, the electrical control signal may arrange the stack to reflect or absorb all, some or none of the light waves from the light source.

At step 330 the stack adjusts its reflectance. More specifically, the voltage source adjusts the bias applied to one or two of the layers of the stack. The change in bias may cause electrophoretic particles, suspended in a fluid encased between two layers of the stack, to move away from their current position. For example, if the electrophoretic particles are currently spread in a thin film along a bottom surface of the upper layer of the two layers encasing the fluid, then adjusting the bias may cause the particles to move towards the top surface of the lower layer.

At step 340 the stack converts the electrical control signal into a modulated optical signal. More specifically, variations or changes in the electrical control signal may adjust the reflectance of the stack. The changes in reflectance affect the light waves that are reflected by the stack. These changes to the reflected light waves make up the variations in the optical signal. It should be noted that the reflected light waves may vary in spectrum from the light waves that are received at step 310. The range of spectrum of the light waves which may be modulated may depend on the material and/or arrangement of the layers of the stack. In other words, the stack may be designed to operate within a relatively wide or narrow range of spectrum.

Modifications, additions, or omissions may be made to the method depicted in FIG. 3. For example, the flowchart may include more, fewer, or other steps. Additionally, steps may be performed in any suitable order and by any suitable component.

Although particular embodiments have been described a myriad of changes, variations, alterations, transformations, modifications and alternate embodiments may be suggested to one skilled in the art, and it is intended that the present invention encompass such changes, variations, alterations, transformations, and modifications as falling within the scope of the appended claims.

What is claimed is:

1. A multilayer light modulator comprising:
   a light modulating stack operable to transform an electrical control signal into a modulated optical signal, the light modulating stack comprising:
   one or more optically reflecting layers;
   one or more optically transmitting layers;
   one or more optically variable layers, the optically variable layers comprising a plurality of electrophoretic particles supported in a fluid contained within at least two parallel surfaces;
   a bias generator coupled to the optically variable layers and responsive to the electrical control signal, wherein the bias generator creates a bias that changes the reflectance of the light modulating stack by causing the electrophoretic particles to substantially cover a first surface of the at least two parallel surfaces based on the bias and to substantially cover a second surface of the at least two parallel surfaces based on a reverse bias.

2. The multilayer light modulator of claim 1, wherein the fluid comprises a material selected from the group consisting of water, hexane, decane, isoparaffinic fluid, and methanol.

3. The multilayer light modulator of claim 1, wherein the electrophoretic particles comprise material selected from the group consisting carbon, rutile, silicon, and graphite.

4. A device comprising:
   a first layer having a first index of refraction;
   a second layer having a second index of refraction;
   a fluid having a third index of refraction enclosed between the first layer and the second layer;
   a plurality of electrically charged particles having a fourth index of refraction suspended in the fluid; and
   a variable voltage source coupled to the first and second layer and operable to cause the plurality of particles to move within the fluid.

5. The device of claim 4, wherein the variable voltage source is configured to:
   apply a first voltage causing the particles to substantially cover a first surface of the first layer; and
   apply a second voltage causing the particles to substantially cover a second surface of the second layer.

6. The device of claim 4, wherein the fluid is of a first viscosity, the first viscosity such that the particles move within the fluid when an electrical force is applied to the particles and are suspended when no electrical force is applied to the particles.

7. The device of claim 4, wherein the particles diffuse light.

8. The device of claim 4, wherein the first refractive index is different than the second refractive index.

9. The device of claim 4, wherein the fluid is substantially optically transparent.

10. The device of claim 4, further comprising at least one additional layer having at least one additional index of refraction.

11. The device of claim 4, wherein the first, second, third, and fourth indices of refraction are selected to maximize a change in reflectance of the device upon the particles moving from a first position to a second position.

12. The device of claim 4, wherein the first and second layers comprise a material selected from the group consisting of silicon, germanium, silicon nitride, rutile, and diamond.

13. The device of claim 4, further comprising a layer of capsules arranged between the first layer and the second layer, the capsules operable to contain the fluid between the first layer and the second layer.

14. The device of claim 4, wherein the plurality of particles comprises a plurality of metallic flakes.

* * * * *